United States Patent [19]

Woiceshyn et al.

[11] Patent Number: 4,762,744

[45] Date of Patent: Aug. 9, 1988

[54] REINFORCING COMPOSITE FOR ROOFING MEMBRANES AND PROCESS FOR MAKING SUCH COMPOSITES

[75] Inventors: Mark Woiceshyn, St. Catherines; Terry J. O'Connor, Fonthill; Ian G. Cooper, St. Catharines, all of Canada

[73] Assignee: Bay Mills Limited, St. Catharines, Canada

[21] Appl. No.: 894,851

[22] Filed: Aug. 8, 1986

[51] Int. Cl.$^4$ .......................... B32B 5/06; D04H 3/02
[52] U.S. Cl. .................................... 428/219; 156/176; 156/278; 156/313; 156/324; 428/141; 428/285; 428/286; 428/287; 428/340; 428/489
[58] Field of Search .............. 428/285, 286, 287, 141, 428/489, 219, 340; 156/176

[56] References Cited

U.S. PATENT DOCUMENTS

| | | | |
|---|---|---|---|
| 3,728,195 | 4/1973 | Bolles | 156/44.1 |
| 4,230,762 | 10/1980 | Iwosaki et al. | |
| 4,368,228 | 1/1983 | Gorgati | 428/285 |
| 4,491,617 | 1/1985 | O'Connor et al. | 428/251 |
| 4,539,254 | 9/1985 | O'Connor et al. | 428/247 |
| 4,617,229 | 10/1986 | Larrsson et al. | 428/913 |

*Primary Examiner*—James C. Cannon
*Attorney, Agent, or Firm*—Fitzpatrick, Cella, Harper & Scinto

[57] ABSTRACT

A reinforcing composite for bituminous roofing membranes is made by combining as a first layer an open network of non-woven adhesive-free continuous filament yarns and as second and third layers, placed one on each side of the first layer, lightweight preformed mats or networks, and thereafter impregnating them with an adhesive resin which is then dried or cured.

19 Claims, No Drawings

REINFORCING COMPOSITE FOR ROOFING MEMBRANES AND PROCESS FOR MAKING SUCH COMPOSITES

SUMMARY OF THE INVENTION

This invention relates to reinforcing composites for use in bituminous roofing membranes. Specifically, this invention comprises composites made from (i) a first layer comprised of an open network of non-woven, continuous filament yarns which are neither fastened together mechanically (as by knitting) nor adhered together, (ii) on one side of the first layer, a second layer comprised of a lightweight preformed mat or network, preferably a polyester mat, and (iii) on the other side of the first layer, a third layer comprised of a lightweight preformed mat or network, preferably a polyester mat. Further, in the composites of this invention, the first layer is held together and affixed to the second and third layers essentially only by leading the three layers together as the first layer is being formed, impregnating them with an adhesive resin and thereafter drying and/or curing the resin. This invention also comprises processes for making such composites, heat stabilization of such composites, and roofing membranes which incorporate such composites as a reinforcement. These composites are flexible, capable of being impregnated by bituminous material, and have sufficient strength to be useful in reinforcing roofing membranes.

DETAILED DESCRIPTION

1. Field of the Invention

In the manufacture of roofing membranes, a reinforcing sheet is saturated with bituminous material by leading the sheet through a tank or vat of bituminous material heated to about 275° to 425° F. (135° to 220° C.) using methods which are known in the art. This invention may also be utilized with cold mastics, i.e., materials which will not come into contact with hot coatings either in the coating process or during application to a roof. The resulting roofing membranes are rolled up for later installation, principally on flat roofs using additional bituminous material or a torch or other source of heat to seal the membrane and the joints. The bituminous material used in making these membranes is often a "modified bitumen" such as asphalt combined with about 20% by weight of atactic polypropylene or 5 to 15% styrene butadiene block copolymer rubber. This invention relates to a new form of composite sheet for use in reinforcing such membranes.

2. Description of the Prior Art

Some of the various kinds of sheets used to reinforce bituminous roofing membranes are described in (1) applicant's U.S. Pat. No. 4,491,617 which describes roofing membranes made using thermoplastic adhesives with a non-woven network, (2) applicant's U.S. Pat. No. 4,539,254, which describes roofing membranes made using thermosetting adhesives with a non woven network and (3) applicant's U.S. application Ser. No. 744,210, filed June 13, 1985, and now abandoned, which describes heat stabilized, mechanically-fastened networks of yarns which may also be mechanically-fastened to polyester mats.

The present invention differs from previous inventions of applicants in the following respects, among others. Rather than (a) preparing an open, non-woven network and (b) applying an adhesive to that network in order to hold the network together, and (c) adhering a mat to that first network, applicants have discovered that it is possible (a) to prepare an open, non-woven network and, before applying any adhesive, (b) to place lightweight mats or networks on both sides of the first network, and thereafter (c) to impregnate the resulting combination with a resin, which adheres the combination together. This has been found to result in unexpectedly better properties. For example, relative to prior art reinforcements made of fiberglass mat or fiberglass mat/fiberglass scrim composites, roofing membranes of this invention show improved finished tear-strength and finished puncture strength as well as better "dead-fold" (that is, less of a tendency of the finished roofing membrane to resume its original flat shape when folded into or against roof corners during installation, for example when used as flashing). In addition, relative to prior art heavy polyester reinforcement mats of equivalent tensile strength, products of this invention made of polyester scrim as the first layer, with second and third layers made of polyester mats, show unexpectedly better properties, especially improved finished tear strength, improved ease of saturation, and improved dimensional stability during impregnation with bitumen and during installation on the roof.

3. Description of the Invention

This invention comprises composites of a first layer of an open network of continuous filament fiberglass or polyester yarns, as described herein, and second and third layers of a lightweight mat or network.

The first layer of this invention is an open network structure made of continuous filament fiberglass or polyester yarn, preferably a network which is neither woven together, nor knit together, nor held together by adhesive. It preferably consists of a non-woven fiberglass scrim prepared for example as described in U.S. Pat. No. 3,728,195 of about 0.1 to 5 ounces per square yard (4 to 200 grams per square meter). Most preferably the fiberglass network weighs about 2 ounces per square yard (75 grams per square meter). Another preferred network consists of a non-woven polyester scrim also prepared for example as described in U.S. Pat. No. 3,728,195 of high tenacity polyester warp and weft yarns and weighing about 0.1 to 5 ounces per square yard (4 to 200 grams per square meter), and may have in addition evenly spaced machine-direction fiberglass continuous filament reinforcement across the entire width. The weight of this fiberglass reinforcement is preferably from about 0.04 to 2.0 ounces per square yard (1.5 to 75 grams per square meter), and most preferably about 0.15 ounces per square yard (6 grams per square meter). An open network consisting entirely of polyester and without heat stabilization may be used with cold mastic. Such polyester networks have the weights described above.

The second and third layers of this invention are a mat or network which, by providing partial or full coverage in the openings or "windows" between the yarns of the first layer, enables the bituminous material to form a continuous sheet on the composite. The second and third layers preferably are a mat which consists essentially of polyester filaments, though other synthetic mats such as mats of nylon or combinations of polyester and nylon, may be used. ("Mat" as used herein refers to an entangled mass of filaments, preferably structures which are spun-bonded.) The mat is preformed, preferably spun-bonded, and lightweight relative to mats used in the prior art without reinforcement in bituminous roofing membranes. More specifically, "lightweight" means a mat weighing about 0.3 to 4 ounces per square yard (10 to 140 grams per square meter), most preferably about 0.5 ounces per square yard (17 grams per square meter). By "preformed" is meant a mat which has been fabricated into the mat form before it is combined with the open network.

A composite of the first, second and third layers of this invention is impregnated with a single coating of adhesive resin. This coating is applied to the composite after or at the time they are brought together. The coating serves to coat at least some individual yarns and filaments, but it does not form a film which closes all openings through the composite.

It has been found that, because only a single resin coating is applied to the composite, rather than the previously used two coatings (one to bind the nonwoven network together and one to adhere a mat to the network), there is a smaller possibility of water reaching the filaments of the composite. The composite of the present invention can also be made thinner, because the first layer is not separated from the second and third by a coating of adhesive. In addition, the composite can be made stiffer than previous polyester mat reinforcements during the manufacturing process, which is desirable from the standpoint of controlling the process, but less stiff in the final product than previous products using thermoset adhesives. Less stiffness in the final product is desirable because it leads to ease of handling, reduced tendency to crack, and use of less material. When two mats are used, one on each side of the network, the adhesive tends to bind one mat to the other through the openings in the network, which helps reduce the possibility of the network coming apart during manufacture of the roofing.

By controlling the adhesive resin used to adhere the second and third layers to the first layer, one is able to control the stiffness of the composite and thereby to tailor it to the manufacturing process and to optimize the quality of the final roofing membrane. The general objective in the coating process is to impregnate each yarn and coat each filament in the composite as completely as possible without the resin filling in opening space between yarns and filaments.

Heat stabilization of the composite may be necessary when polyester in the composite has not previously been heat stabilized to the temperatures necessary for the applications intended for the product. Heat stabilization, if needed, may be accomplished by subjecting the composite to heat treatment, for example by passing the composite through an oven while conditions such as temperature, tension, and dwell-time at high temperature are controlled to achieve minimal shrinkage in the machine and cross-machine directions at temperatures used in saturating with bituminous material. It is preferred to use temperatures up to about 460° F. (238° C.) and to control the tension and dwell-time to result in shrinkage during the heat stabilization step of 5% to 10%, with the resulting composite having a free shrinkage of less than 1% in both machine and cross-machine directions as a result of the combination of heat setting and heat relaxation which occurs under these conditions. In making the measurement of free shrinkage, it is preferred to cut ten strips of fabric ten inches long by one inch wide. Five are cut in the machine direction and five in the cross-machine direction at positions selected from across the width of the structure. These strips are placed vertically in an oven under light tension just sufficient to keep them straight. The shrinkage of each set of five samples is measured after five minutes at 400° F. (204° C.) and the results are averaged. If the average shrinkage is too great (greater than one percent) in either direction, the composite is run through the heat stabilization treatment again at higher temperature, or slower speed, or less tension, until the desired level of free shrinkage is reached.

"Resins" is used to mean chemicals that increase stiffness, provide water resistance, or otherwise improve properties of the polyester composite or the properties of the final roofing membrane. Resins are added by thoroughly saturating the composite at an add-on rate of about 5 to 100 parts of resin per 100 parts by weight of composite but preferably with about 10 to 20 parts of resin.

The resin is typically a cross-linked acrylic resin but may be any resinous material which is unaffected by water and retains its bonding properties up to temperatures used in making roofing membranes. For finished roofing membranes containing a polyester composite or a polyester/fiberglass combination as a reinforcement, both the amount of resin added and the stiffness of the resin may be adjusted to achieve desired properties. For example, when the final roofing membrane is to be thick, stiffer reinforcements may be required to help processing through the production line. Also, a stiffer reinforcement is required for low modulus asphalt membranes to facilitate handling during installation on the roof, and also to improve roll integrity and minimize damage in transit.

The following examples will illustrate the invention.

EXAMPLE 1

Using a machine of the kind described in U.S. Pat. No. 3,728,195, a fiberglass fabric was formed having 6 yarns per inch in the machine direction and 6 yarns per inch in the cross-machine direction of 37 1/0 fiberglass yarn. Spun-bonded polyester mat weighing 0.5 oz/sqyd was applied to each side of the fiberglass structure and the assembly was in turn saturated with 20 parts (per 100 parts by weight of composite) of a black-tinted cross-linking acrylic latex resin saturant consisting of Rohm and Haas Rhoplex HA 16 (92 parts by weight per 100 parts of the solids content of the saturant), Cymel 303 cross-linking agent (4.4 parts), black pigment (2.8 parts) and ammonium nitrate as a catalyst (0.8 parts) in water (in the proportion of 28% by weight of solids to 72% by weight of water), and the composite was dried and cured. Conditions of tension, speed, solids content of the saturant, and pressure used to squeeze off excess saturant were adjusted such that the acrylic latex resin did not form a surface film on the structure of yarns. Tension control was also important to ensure addition of the polyester mats in a wrinkle free yet relaxed manner. The resulting structure was suitable for use as a reinforcing composite for roofing membranes.

EXAMPLE 2

Using a machine as described in Example 1, a polyester fabric was formed having 5 yarns per inch in the machine direction and 5 yarns per inch in the cross-machine direction of high tenacity 1000 denier polyester yarn. In addition, 75 1/0 fiberglass yarns were added at 2 yarns per inch in the machine direction. This yarn structure weighed 1.57 oz/sqyd. Spun bonded polyester mat weighing 0.5 oz/sqyd was applied to each side of the fiberglass structure and the assembly.

This structure was heat stabilized by unrolling it and feeding over a series of preheated rolls at 450° F. then through a heated nip at 450° F., under tension which was controlled to keep the fiberglass yarns taut and overcome the shrink force of the machine direction polyester yarns. Dwell-time was adjusted until the finished fabric had 1% or less of free shrinkage, in both the machine and cross-machine direction when tested at 400° F. for five minutes. The resulting structure was suitable for use as a reinforcing composite for roofing membranes.

EXAMPLE 3

Using a LIBA Copcentra machine, a warp-knit weft-inserted polyester knit structure was created having 9 yarns per inch in the machine direction and 9 yarns per inch in the weft direction of 1000 denier high tenacity polyester yarn. The knitting yarn used was 70 denier regular tenacity polyester yarn. A chain stitch was used to combine the structure with 70 denier yarn spaced at 9 stitches/inch over each 1000 denier warp yarn and forming a full stitch between each 1000 denier weft yarn.

The polyester structure was heat stabilized by unrolling it and feeding over a series of preheated rolls at 450° F., then through a heated nip at 450° F., under tension which was controlled to result in an overfeed into the heating section of 5%. Conditions were adjusted until the finished fabric had 1% or less of free shrinkage in both the machine and cross machine directions when tested at 400° F. for five minutes as described above.

The heat stabilized polyester structure was then led onto one side of a non-woven, adhesive-free fiberglass scrim as it was being formed. The fiberglass scrim had 6 yarns per inch in both the machine and cross machine directions of 37 1/0 fiberglass yarns. At the same time, a spun-bonded polyester mat weighing 0.5 oz/sq yd was led onto the other side of the fiberglass scrim.

This combination of three layers was coated with 20 parts (per 100 parts by weight of the combination of the three layers) of black-tinted cross-linking acrylic latex resin saturant consisting of Rohm & Haas Rhoplex HA16 (92 parts by weight per 100 parts of the solids content of the saturant), Cymel 303 cross-linking agent (4.4 parts), black pigment (2.8 parts) and ammonium nitrate as a catalyst (0.8 parts) in water (in the proportion of 28% by weight of solids to 72% by weight of water), and the resulting composite was dried and cured. Conditions of tension, speed, solids content of the saturant, and pressure used to squeeze off excess saturant were adjusted such that the acrylic latex penetrated the fiber bundles and the finished surface remained porous, i.e. the acrylic latex did not form a surface film. The resulting structure was suitable for use as a reinforcing composite for roofing membranes.

We claim:

1. A process for making a composite for use in reinforcing roofing membranes comprising the steps of:
    selecting as a first layer a non-woven network of continuous filament yarns,
    which are neither fastened together mechanically nor adhered together,
    selecting as a second layer a lightweight preformed synthetic mat or network,
    selecting as a third layer a lightweight preformed synthetic mat or network,
    placing the second layer on one side of the first layer and the third layer on the other side of the first layer as the first layer is being formed,
    applying to the three layers as placed together an adhesive resin, and
    drying and/or curing said resin,
wherein the resulting is flexible, capable of being impregnated by bituminous material, and of sufficient strength to be useful in reinforcing roofing membranes.

2. The process of claim 1 in which a mat is used and the mat consists essentially of polyester filaments.

3. The process of claim 1 in which the network of the first layer consists essentially of fiberglass yarns.

4. The composite of claim 1 in which the first layer is a non-woven fiberglass scrim of about 0.1 to 5 ounces per square yard.

5. The composite of claim 1 in which the first layer comprises high tenacity polyester yarns and weighs about 0.1 to 5 ounces per square yard.

6. The composite of claim 5 in which the first layer also comprises a fiberglass continuous filament reinforcement of about 0.04 to 2.0 ounces per square yard.

7. The process of claim 1 which comprises the additional step of heat stabilizing at least one of the three layers of the composite.

8. The process of claim 1 which comprises the additional step of heat stabilizing the composite.

9. The process of claim 8 in which the resulting composite has a heat free shrinkage of less than 1% in both machine and cross-machine directions.

10. A composite for reinforcing roofing membranes comprising (i) as a first layer an open, non-woven network of continuous filament yarns which are neither fastened together mechanically nor adhered together, (ii) on one side of the first layer, as a second layer, a lightweight preformed synthetic mat or network, (iii) on the other side of the first layer, as a third layer, a lightweight synthetic mat or network, and (iv) a single resin coating which adheres the three layers together and impregnates at least some of the individual yarns without forming a film that closes all openings through the composite, wherein the composite is flexible, capable of being impregnated by bituminous material, and of sufficient strength to be useful in reinforcing such membranes.

11. The composite of claim 10 in which a mat is used and the mat consists essentially of polyester filaments.

12. The composite of claim 11 in which the mat is spun-bonded.

13. The composite of claim 11 in which the mat weighs about 0.3 to 4 ounces per square yarn.

14. The composite of claim 11 in which at least one layer of the composite is heat stabilized.

15. The composite of claim 14 in which all layers of the composite are heat stabilized.

16. The composite of claim 10 in which the composite has a heat free shrinkage of less the 1% in both machine and cross machine directions.

17. The composite of claim 10 in which the network of the first layer consists essentialy of fiberglass yarns.

18. The composite of claim 10 which consists essentially of a polyester network and two mats, one on each side of the network.

19. The composite of claim 10 which includes continuous filament fiberglass yarns in the second or third layer.

* * * * *

UNITED STATES PATENT AND TRADEMARK OFFICE
CERTIFICATE OF CORRECTION

PATENT NO. : 4,762,744
DATED : August 9, 1988
INVENTOR(S) : MARK WOICESHYN, ET AL.

It is certified that error appears in the above-identified patent and that said Letters Patent is hereby corrected as shown below:

COLUMN 6

Line 7, "resulting is" should read --resulting composite is--.
Line 57, "the" should read --than--.

Signed and Sealed this

Tenth Day of January, 1989

Attest:

DONALD J. QUIGG

*Attesting Officer*    *Commissioner of Patents and Trademarks*